(12) United States Patent
Liu

(10) Patent No.: US 12,551,005 B1
(45) Date of Patent: Feb. 17, 2026

(54) TOOTHBRUSH AND TOOTHBRUSH HEAD

(71) Applicant: Guangdong Yingxin Technology Co., Ltd, Guangdong (CN)

(72) Inventor: Yafei Liu, Guangdong (CN)

(73) Assignee: Guangdong Yingxin Technology Co., Ltd, Dongguan (CN)

( * ) Notice: Subject to any disclaimer, the term of this patent is extended or adjusted under 35 U.S.C. 154(b) by 0 days.

(21) Appl. No.: 19/223,343

(22) Filed: May 30, 2025

(30) Foreign Application Priority Data

Apr. 13, 2025 (CN) .......................... 202510457098.1

(51) Int. Cl.
*A46B 7/06* (2006.01)
*A46B 5/00* (2006.01)
*A46B 9/04* (2006.01)

(52) U.S. Cl.
CPC .............. *A46B 7/06* (2013.01); *A46B 5/0095* (2013.01); *A46B 9/04* (2013.01); *A46B 2200/1066* (2013.01)

(58) Field of Classification Search
CPC .... A46B 7/02; A46B 7/06; A46B 9/04; A46B 5/002; A46B 5/0025; A46B 5/0029; A46B 5/0033; A46B 5/0041
See application file for complete search history.

(56) References Cited

U.S. PATENT DOCUMENTS

| | | | |
|---|---|---|---|
| 7,322,066 B2 | 1/2008 | Ping | |
| 7,392,562 B2 | 7/2008 | Boland | |
| 7,845,042 B2 * | 12/2010 | Moskovich | ........ A61C 17/3481 15/167.1 |
| 8,806,695 B2 * | 8/2014 | Moskovich | ............ A46B 5/026 15/201 |
| 9,486,059 B2 * | 11/2016 | Wechsler | ................. A46B 9/04 |
| 10,568,725 B2 | 2/2020 | Sedic | |
| 2023/0248497 A1 | 8/2023 | Muller et al. | |

FOREIGN PATENT DOCUMENTS

| | | | | |
|---|---|---|---|---|
| JP | H06327517 A | * | 11/1994 | ............... A46B 7/00 |
| KR | 10-2016-0104155 A | * | 9/2016 | ............... A46B 9/02 |

* cited by examiner

*Primary Examiner* — Laura C Guidotti

(57) ABSTRACT

A toothbrush head includes: a brush rod and a brush head assembly connected to the brush rod. The brush head assembly includes a bristle fixing member and a body. The bristle fixing member includes a first side surface and a second side surface. The first side surface is provided with a plurality of bristles. The body includes a first end and a second end. The second end is connected to the brush rod, and the first end is extended to form a supporting beam. The supporting beam is located on a side of the bristle fixing member away from the plurality of bristles. An elastomer is filled between the supporting beam and the bristle fixing member, and a pivot-forming structure is provided on the supporting beam and/or the bristle fixing member.

19 Claims, 15 Drawing Sheets

TOOTHBRUSH AND TOOTHBRUSH HEAD

CROSS REFERENCE TO RELATED APPLICATIONS

The present application claims priority benefits of Chinese patent application NO. 2025104570981, filed on Apr. 13, 2025, the content of which is incorporated by reference in its entirety.

TECHNICAL FIELD

The present disclosure relates to the technical field of toothbrushes, particularly, a toothbrush and a toothbrush head thereof.

BACKGROUND

Toothbrushes are essential oral care tools for people. With the advent of electric toothbrushes, their high efficiency, portability, and superior cleaning performance have made them increasingly popular among consumers.

The brush head is equipped with bristles of moderate stiffness, which not only provide adequate support during oral cleaning but also prevent damage to the gums. However, relying solely on bristle design is insufficient to ensure optimal toothbrush performance, indicating room for improvement.

SUMMARY

A first aspect of the present disclosure provides a toothbrush head, including a brush rod and a brush head assembly connected to the brush rod. The brush head assembly includes: a bristle fixing member including a first side surface and a second side surface opposite to each other, the first side surface being provided with a plurality of bristles; a body including a first end and a second end opposite to each other, the second end being connected to the brush rod, a supporting beam extending from the first end, the supporting beam being located on a side of the bristle fixing member away from the plurality of bristles; an elastomer being provided between the supporting beam and the bristle fixing member, and a pivot-forming structure being provided on the supporting beam and/or the bristle fixing member to allow the supporting beam and the bristle fixing member to oscillate relative to each other along an axis defined by the pivot-forming structure.

A second aspect of the present disclosure further provides a toothbrush, which includes a toothbrush head and a brush handle, and a brush rod of the toothbrush head and the brush handle are detachably connected or integral; the toothbrush head is the toothbrush head described above.

BRIEF DESCRIPTION OF THE DRAWINGS

The drawings that form part of the present disclosure are provided to further illustrate the present disclosure. The illustrative embodiments and their descriptions of the present disclosure are intended to explain but do not constitute an undue limitation on the present disclosure.

Figure 1:
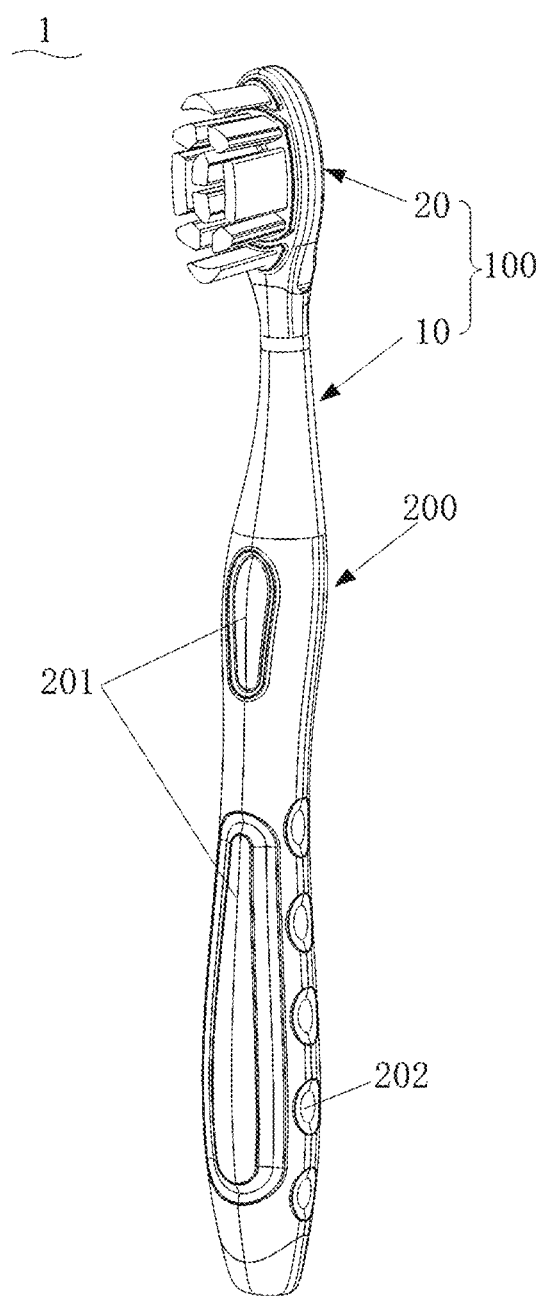
FIG. 1 is a perspective view of a toothbrush according to some embodiments of the present disclosure.

In order to facilitate the display of the toothbrush replacement head, the structures in some drawings are enlarged.

DETAILED WAY

The following will be combined with the drawings in the embodiments of the present disclosure to clearly and completely describe the technical solutions in the embodiments of the present disclosure. Obviously, the described embodiments are only part but not all of the embodiments. Based on the embodiments in the present disclosure, all other embodiments obtained by those skilled in the art without creative work belong to the protection scope of the present disclosure.

It should be noted that all directional indications in the embodiments of the present disclosure (such as up, down, left, right, front, back, etc.) are only configured to explain the relative position relationship, movement, etc. between the components under a certain posture (as shown in the drawings). If the specific posture changes, the directional indication will also change accordingly.

In the present disclosure, unless otherwise clearly specified and limited, the terms "connection", "fixation", etc. should be understood in a broad sense. For example, "fixation" may be a fixed connection, a detachable connection, or an integral connection; it may be a mechanical connection or an electrical connection; it may be directly connected or indirectly connected through an intermediate medium, it may be the internal connection of two elements or the interaction relationship between two elements, unless otherwise clearly defined. For those skilled in the art, the specific meanings of the above terms in the present disclosure may be understood according to the specific circumstances.

In addition, if there are descriptions involving "first", "second", etc. in the embodiments of the present disclosure, the descriptions of "first", "second", etc. are only for descriptive purposes and cannot be understood as indicating or implying their relative importance or implicitly indicating the number of technical features indicated. Therefore, the features defined as "first" and "second" may explicitly or implicitly include at least one of the features. In addition, the meaning of "and/or" appearing in the full text includes three parallel schemes. Taking "A and/or B" as an example, it includes scheme A, scheme B, or schemes that satisfy both A and B. In addition, the technical schemes between the various embodiments may be combined with each other, but they must be based on the ability of those skilled in the art to implement them. When the combination of technical schemes is contradictory or cannot be implemented, it should be considered that such a combination of technical schemes does not exist and is not within the protection scope required by the present disclosure.

The present disclosure proposes a new toothbrush structure, and in particular, a toothbrush head structure. The toothbrush mentioned in the present disclosure may be a manual toothbrush or an electric toothbrush.

As illustrated in FIG. 1, the toothbrush 1 includes a toothbrush head 100 and a brush handle 200. The toothbrush head 100 includes a brush rod 10 and a brush head assembly 20 connected to the brush rod 10. The brush rod 10 may be integrally formed with the brush handle 200, allowing the toothbrush head 100 and the brush handle 200 to be an integral structure. In some embodiments, the brush rod 10 and the brush handle 200 are detachably connected. For example, one end, facing the brush rod 10, of the brush handle 200 has a mounting flange; and one end, facing the brush handle 200, of the brush rod 10 defines a mounting hole for receiving the mounting flange. The detachable connection between the brush rod 10 and the brush handle 200 is achieved by threading or snapping the mounting flange into the mounting hole. Furthermore, at least one elastomer mounting position 201 may be provided on a front of the brush handle 200 (the surface on the side where the bristles are located) for installing an elastomer. A plurality of gripping positions 202 are also provided on a side of the brush handle 200 to facilitate a user to hold the toothbrush 1.

Figure 2:
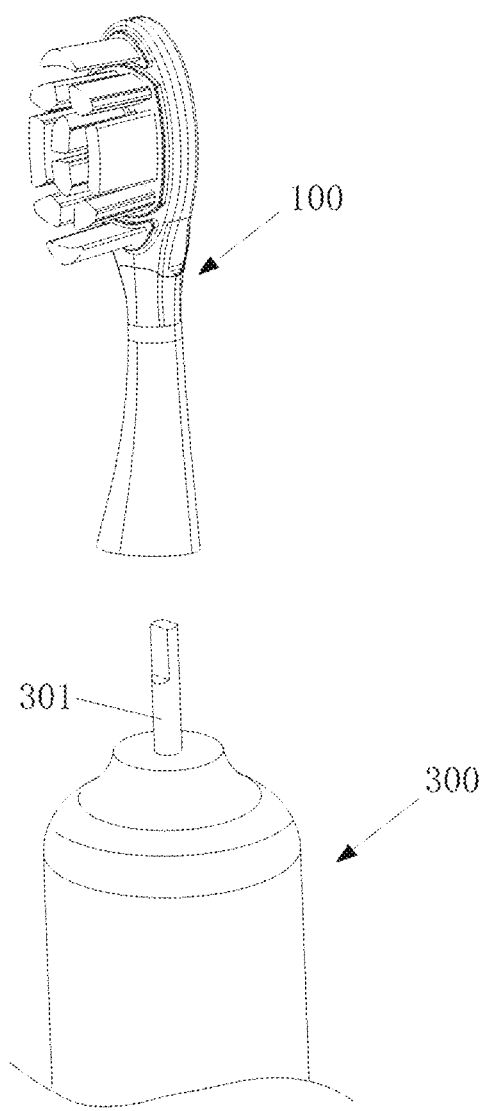
FIG. 2 is a perspective view of a toothbrush according to some embodiments of the present disclosure.
Figure 3:
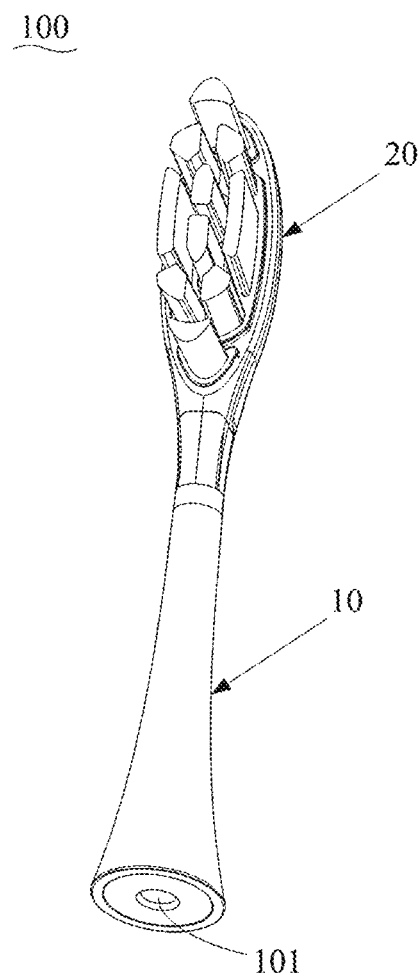
FIG. 3 is a perspective view of a toothbrush head according to some embodiments of the present disclosure.

As illustrated in FIG. 2 and FIG. 3, the toothbrush 1 includes a toothbrush head 100, a main unit 300, a motor assembly, a control circuit, a power supply and other structures (not shown) disposed in the main unit 300. The main unit 300 is also called a brush handle. The toothbrush head 100 is connected to the main unit 300 by a detachable connection, which is convenient for replacing the toothbrush head 100. A power transmission shaft 301 protrudes from one end of the main unit 300 toward the toothbrush head 100, and one end of the toothbrush head 100 proximal to the main unit 300 defines a motor shaft insertion hole 101. The power transmission shaft 301 is inserted into the motor shaft insertion hole 101 of the brush head 100, allowing the brush head 100 to be installed on the main unit 300. When the motor assembly is working, the power transmission shaft 301 transmits power to the toothbrush head 100, thereby driving the toothbrush head 100 to rotate or vibrate and achieving efficient cleaning of the oral cavity of a user.

As illustrated in FIG. 3, FIG. 4, FIG. 5 and FIG. 6, in some embodiments of the present disclosure, the toothbrush head 100 includes a brush rod 10 and a brush head assembly 20 connected to the brush rod 10.

The brush rod 10 is cylindrical, including a first end and a second end. The first end of the brush rod 10 is closer to the brush head assembly 20 relative to the second end. One end of the brush head assembly 20 proximal to the brush rod 10 is detachably connected to the brush rod 10, or is integrally formed.

The brush head assembly 20 includes a bristle fixing member 21, a body 23, and an elastomer 25.

The bristle fixing member 21 includes a first side surface 21a, a second side surface 21b opposite to the first side surface 21a, and a peripheral side surface 21c connecting the first side surface 21a and the second side surface 21b. A plurality of bristles 22 are installed on the first side surface 21a of the bristle fixing member 21. A top of the bristles 22 is in a shape of a gold ingot, which is conducive to improving the cleaning effectiveness of the toothbrush.

The body 23 includes a first end 23a and a second end 23b opposite to each other, and the second end 23b of the body 23 is connected to the brush rod 10. The second end 23b of the body 23 is detachably connected to the brush rod 10 or formed in one piece with the brush rod 10. The first end of the brush rod 10 extends proximal to the brush head assembly 20 to form the body 23.

A supporting beam 24 extends from the first end 23a of the body 23 in a direction away from the second end 23b. The supporting beam 24 is located on a side of the bristle fixing member 21 away from the plurality of bristles 22. A contact portion and a non-contact portion are formed between the supporting beam 24 and the bristle fixing member 21. In this way, the contact portion defines an axis, and the supporting beam 24 and the bristle fixing member 21 oscillate mutually around the axis toward the non-contact portion.

In some embodiments, the supporting beam 24 is in a strip shape, including a first surface 24a, a second surface 24b opposite to the first surface 24a, and a connecting surface 24c connecting the first surface 24a and the second surface 24b. The first surface 24a of the supporting beam 24 faces the second side surface 21b of the bristle fixing member 21. The first surface 24a of the supporting beam 24 is partially in contact with the second side surface 21b of the bristle fixing member 21. There is a gap between a remaining portion of the supporting beam 24 and the second side surface 21b of the bristle fixing member 21, forming a non-contact portion.

The elastomer 25 at least covers the second side surface 21b of the bristle fixing member 21 and fills the non-contact portion, that is, the gap between the supporting beam 24 and the bristle fixing member 21. The elastomer 25 is filled in the non-contact portion, when a force is applied, the supporting beam 24 and the bristle fixing member 21 oscillate mutually around the axis defined by the contact portion. Through the elastomer 25, on the one hand, the elasticity of the elastomer may be configured to control the oscillate within a certain range; and on the other hand, when the force disappears, the supporting beam 24 and the bristle fixing member 21 may be restored to the initial state.

In some embodiments, the elastomer 25 extends from the second side surface 21b of the bristle fixing member 21 to the peripheral side surface 21c of the bristle fixing member 21, and may also extend from the second side surface 21b of the bristle fixing member 21 to the peripheral side surface 21c and then to the first side surface 21a of the bristle fixing member 21. In this way, the bristle fixing member 21 is more tightly covered. Moreover, the elastomer 25 also reduces the damage to the oral cavity caused by the bristle fixing member 21.

In some embodiments, the elastomer 25 extends from the second side surface 21b of the bristle fixing member 21 to the connecting surface 24c of the supporting beam 24, and is flush with the second side 24b of the supporting beam 24. The second side 24b of the supporting beam 24 is exposed from the elastomer 25, or the second side 24b of the supporting beam 24 is completely covered by the elastomer 25. Therefore, the elastomer 25 covers the supporting beam 24 more tightly, and the elastomer 25 also reduces the damage to the oral cavity caused by the bristle fixing member 21.

Figure 6:
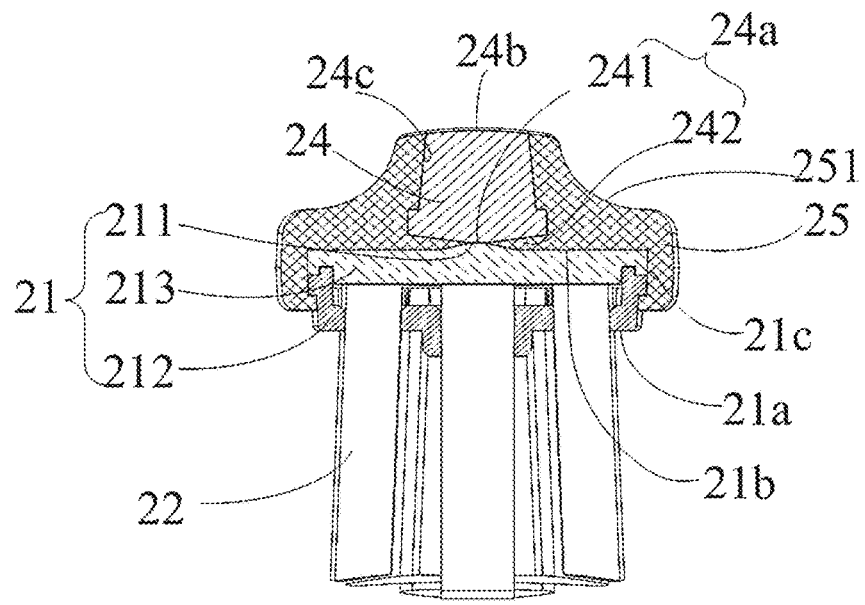
FIG. 6 is a cross-sectional view of a toothbrush head taken along a direction perpendicular to an extension direction of a toothbrush handle according to some embodiments of the present disclosure.

In some embodiments, as illustrated in FIG. 6, a portion of the elastomer 25 is defined with a concave arc groove 251, and a portion of the elastomer 25 covers the connecting surface 24c of the supporting beam 24. The setting of the concave arc groove 251 makes the bristle fixing member 21 and the supporting beam 24 oscillate against each other more easily. An extension direction of the concave arc groove 251 is consistent with an extension direction of the axis.

In some embodiments, the connecting surface 24c of the supporting beam 24 is also defined with a concave-convex surface, such as the step surface shown in FIG. 6, which not only improves the strength of the supporting beam 24, but also increases the contact area between the connecting surface 24c of the supporting beam 24 and the elastomer 25, thereby stabilizing the connection between the two.

Figure 4:
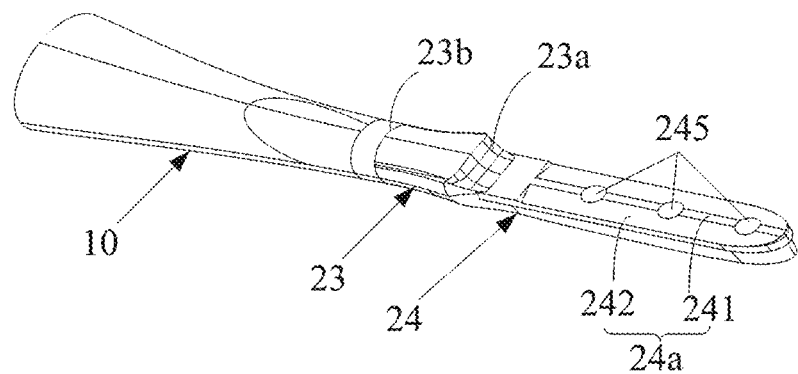
FIG. 4 is a perspective view of a supporting beam in a toothbrush head according to some embodiments of the present disclosure.
Figure 5:
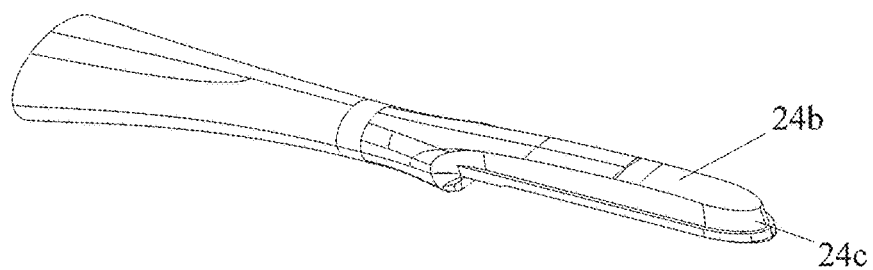
FIG. 5 is a perspective view of a supporting beam in a toothbrush head according to some embodiments of the present disclosure.

As illustrated in FIG. 4, in some embodiments, the first surface 24a of the supporting beam 24 includes a first support surface 241 and a first oscillating surface 242. The first support surface 241 is located in the middle of the first surface 24a, and the first oscillating surface 242 is located on both sides of the first support surface 241. The first oscillating surface 242 is an inclined surface, extending outward in a direction parallel to the first support surface 241, and also extending in a direction perpendicular to the first support surface 241 and away from the first support surface 241. In this way, when the supporting beam 24 is installed with the bristle fixing member 21, the first support surface 241 abuts against the second side surface 21b of the bristle fixing member 21 to form a contact portion, and there is a gap between the first oscillating surface 242 and the second side surface 21b of the bristle fixing member 21, forming a non-contact portion. The first support surface 241 of the supporting beam 24 is configured as a pivot-forming structure, defining an axis. The extension direction of the first support surface of the supporting beam 24 is the axial direction. The supporting beam 24 and the bristle fixing member 21 oscillate relative to each other around the axis of the first support surface 241 in a direction perpendicular to the extension direction of the body 23. In other words, the supporting beam 24 and the bristle fixing member 21 oscillate around the axis toward the first oscillating surface 242.

Figure 7:
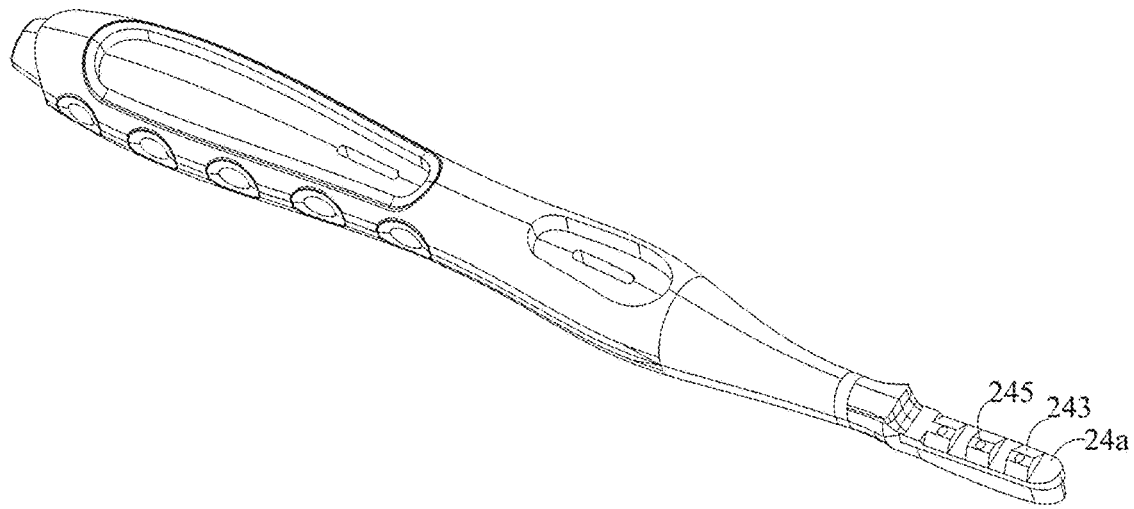
FIG. 7 is a perspective view of a supporting beam in a toothbrush head according to some embodiments of the present disclosure.

As illustrated in FIG. 7, in some embodiments, a first protrusion 243 is protruded on the first surface 24a of the supporting beam 24. The quantity of the first protrusion 243 is one, two or more. If there are two or more first protrusions 243, an extension direction of each first protrusion 243 is on a same straight line. The first protrusion 243 defines a contact portion and a non-contact portion between the first surface 24a of the supporting beam 24 and the second side surface 21b of the bristle fixing member 21. The first protrusion 243 is configured as a pivot-forming structure which defines an axis. The extension direction of the first protrusion 243 is the axial direction. The supporting beam 24 and the bristle fixing member 21 mutually oscillate around the axis defined by the first protrusion 243 in a direction perpendicular to the extension direction of the body 23.

Further, as illustrated in FIG. 8A-FIG. 8F, a cross-section of the first protrusion 243 along a direction perpendicular to the first surface 24a of the supporting beam 24 is a triangle, a trapezoid or a crescent. Correspondingly, a portion of the second side surface 21b of the bristle fixing member 21 that contacts the supporting beam 24 may be a plane or a concave surface.

Figure 8A:
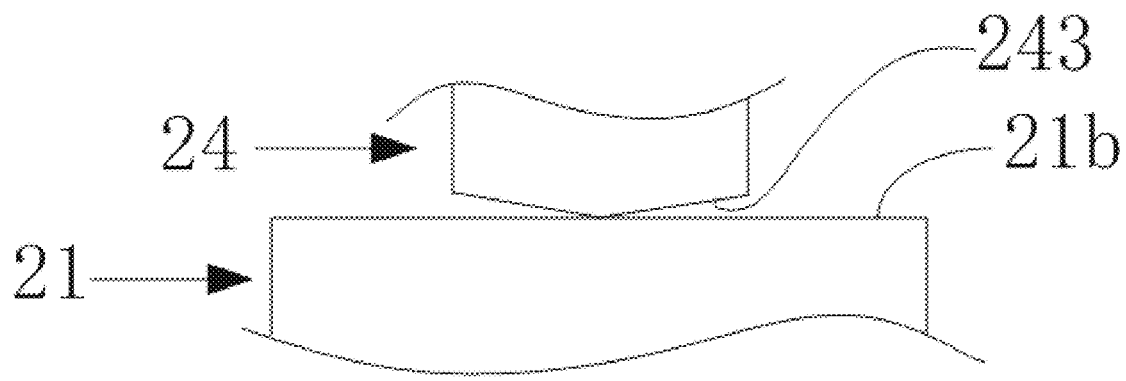
FIG. 8A-FIG. 8F are perspective views of contact portions and non-contact portions formed between a supporting beam and a bristle fixing member in a toothbrush head of multiple embodiments of the present disclosure.
Figure 8B:
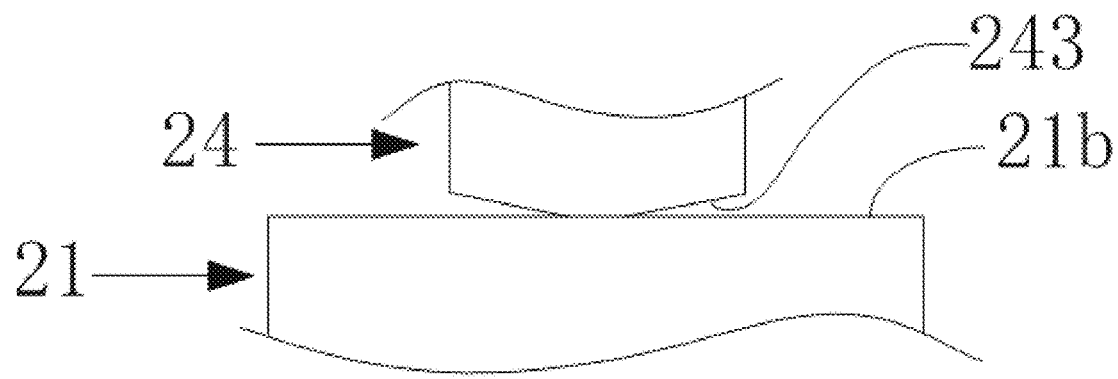
Figure 8C:
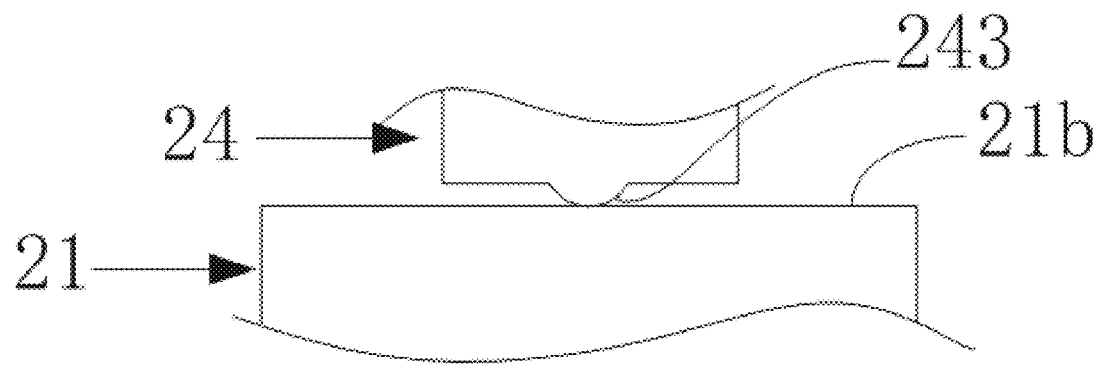
Figure 8D:
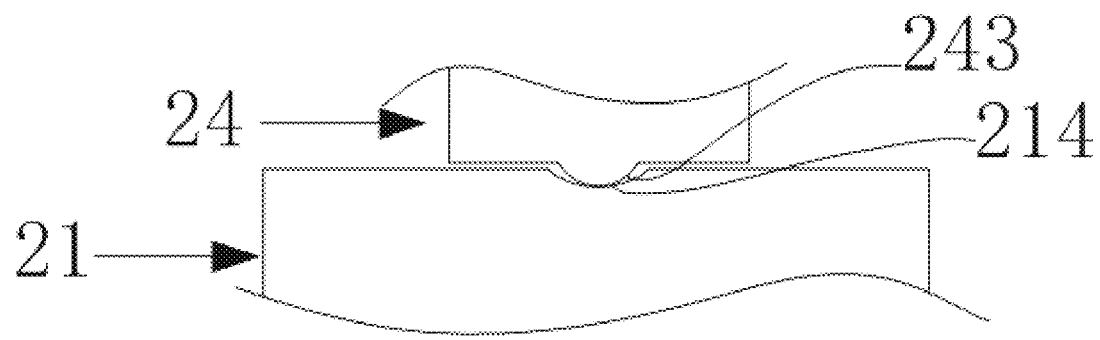
Figure 8E:
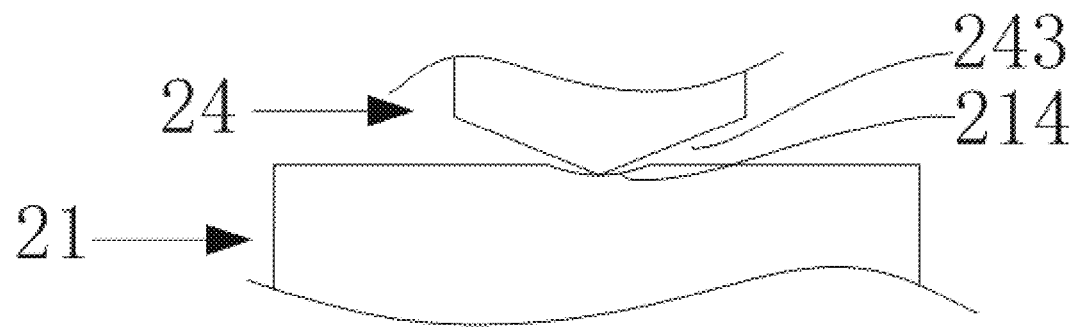
Figure 8F:
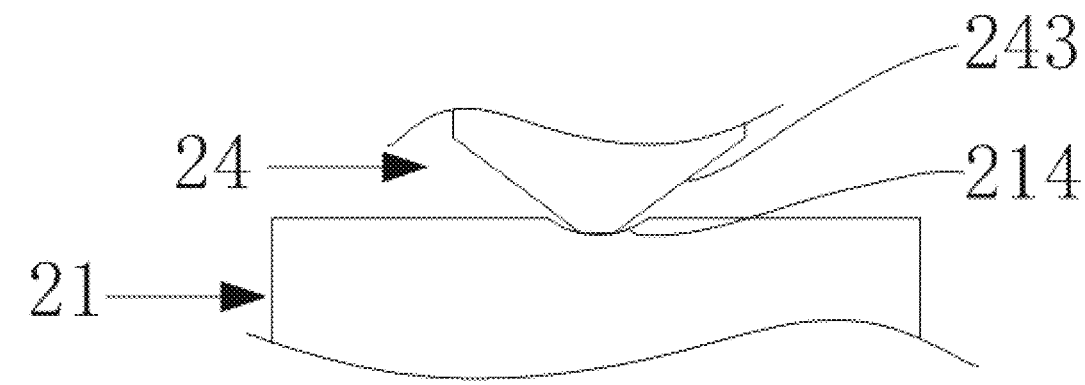

In some embodiments, as illustrated in FIG. 8D, the second side surface 21b of the bristle fixing member 21 is defined with a first inner recess 214. A curvature radius of an inner arc surface of the first inner recess 214 is greater than a curvature radius of an outer arc surface of the first protrusion 243, allowing a contact portion and a non-contact portion to be formed between the bristle fixing member 21 and the supporting beam 24.

Figure 9:
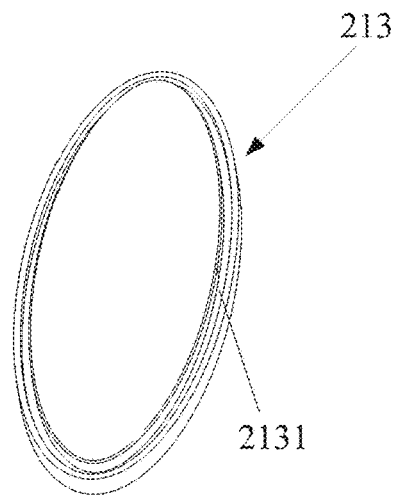
FIG. 9 is a perspective view of a cover of a bristle fixing member in a toothbrush head according to some embodiments of the present disclosure.
Figure 10:
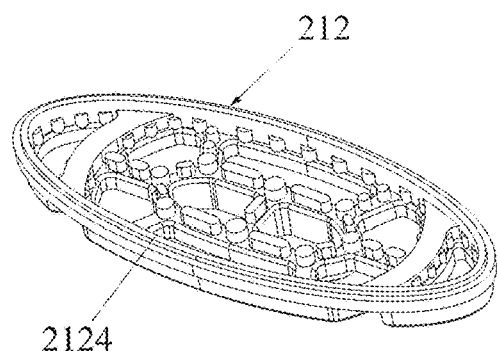
FIG. 10 is a perspective view of a brush sheet of a bristle fixing member in a toothbrush head according to some embodiments of the present disclosure.
Figure 11:
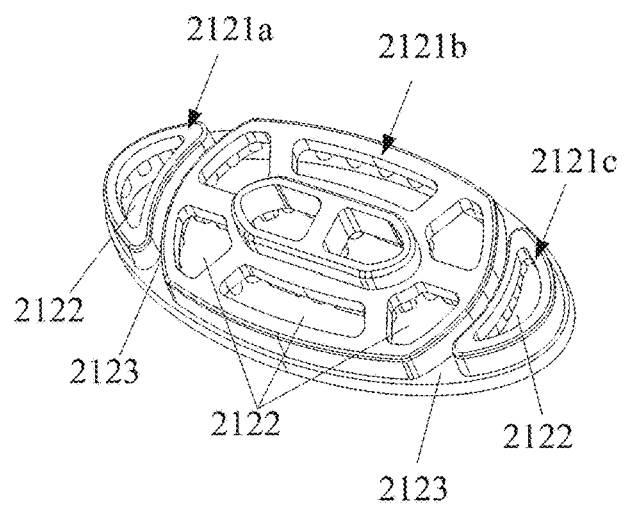
FIG. 11 is a perspective view of a brush sheet of a bristle fixing member in the toothbrush head according to some embodiments of the present disclosure.
Figure 12:
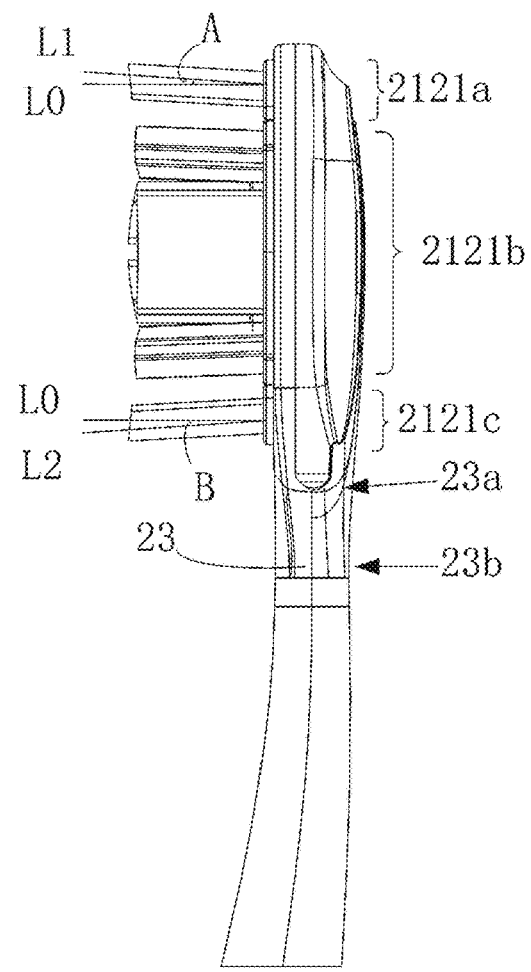
FIG. 12 is a perspective view of a toothbrush head according to some embodiments of the present disclosure.
Figure 13:
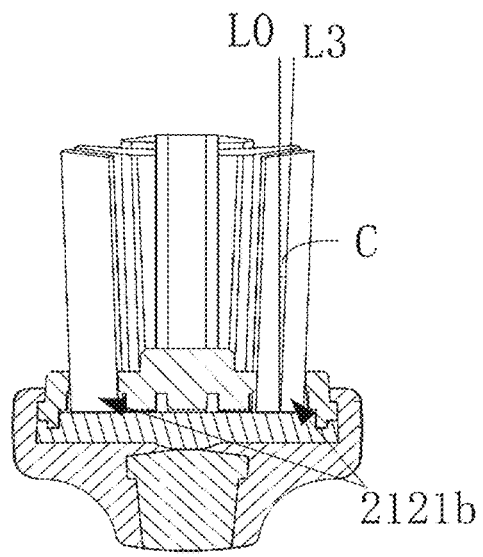
FIG. 13 is a cross-sectional view of a toothbrush head taken along a direction perpendicular to an extension direction of a toothbrush handle according to some embodiments of the present disclosure.

As illustrated in FIG. 6 and FIG. 9 and FIG. 10, the bristle fixing member 21 includes a brush sheet 212 and a cover 213, and the brush sheet 212 and the cover 213 are snap-fitted to each other. In some embodiments, as shown in FIG. 9 and FIG. 10, an edge of one side of the brush sheet 212 away from the bristles 22 includes a first engaging portion 2124, and an outer periphery of the cover 213 includes a second engaging portion 2131, and the first engaging portion 2124 and the second engaging portion 2131 are engaged with each other to secure the brush sheet 212 and the cover 213. The first engaging portion 2124 may be disposed around the edge of the brush sheet 212, and the second engaging portion 2131 may also be disposed around the cover 213. The first engaging portion 2124 may be a flange, and the second engaging portion 2131 may be a groove; or the first engaging portion 2124 may be a groove, and the second engaging portion 2131 may be a flange.

One side of the cover 213 away from the brush sheet 212 is the second side surface 21b of the bristle fixing member 21. The cover of the bristle fixing member 21 may also be omitted, and one side of the brush sheet 212 away from the bristles 22 is the second side surface 21b of the bristle fixing member 21.

Further, as illustrated in FIG. 10, FIG. 11, FIG. 12, and FIG. 13, one side of the brush sheet 212 defines at least two bristle mounting areas, and each bristle mounting area defines at least one bristle mounting hole 2122. The bristles 22 are welded in the at least one bristle mounting hole 2122. In this way, it is avoided to set a copper sheet to install the bristles. Furthermore, a groove 2123 is formed between each bristle mounting area, and the groove 2123 is filled with the elastomer. In this way, the elastomer 25 wraps the brush sheet 212 more tightly when it extends to the first side 21a of the bristle fixing member 21.

The bristle mounting area includes a first bristle mounting area 2121a away from the body 23, a third bristle mounting area 2121c proximal to the body 23, and a second bristle mounting area 2121b located between the first bristle mounting area 2121a and the third bristle mounting area 2121c. The bristles in the first bristle mounting area 2121a are tilted in a direction away from the body 23, and/or the bristles located on a peripheral side of the second bristle mounting area 2121b are tilted in the direction proximal to the body 23, and/or the bristles in the third bristle mounting area 2121c are tilted in the direction proximal to the body 23. Inclined bristles may enhance the cleaning effectiveness of the toothbrush.

In some embodiments, L0 is a straight line in a direction perpendicular to the brush sheet 212 or the cover 213, L1 is a straight line in an extension direction of the bristles in the first bristle mounting area 2121a, and an inclination angle A of the bristles in the first bristle mounting area 2121a is 1-5°. In some embodiments, the inclination angle A is 3°. In some embodiments, L3 is a straight line in an extension direction of the outer bristles in the second bristle mounting area 2121b, and an inclination angle C of the bristles in the peripheral area of the second bristle mounting area 2121b is 1-5°. In some embodiments, the inclination angle C is 2°; In some embodiments, L2 is a straight line in an extension direction of the bristles in the third bristle mounting area 2121c, and an inclination angle B of the bristle in the third bristle mounting area 2121c is 1-5°. In some embodiments, the inclination angle B is 3°.

Figure 14:
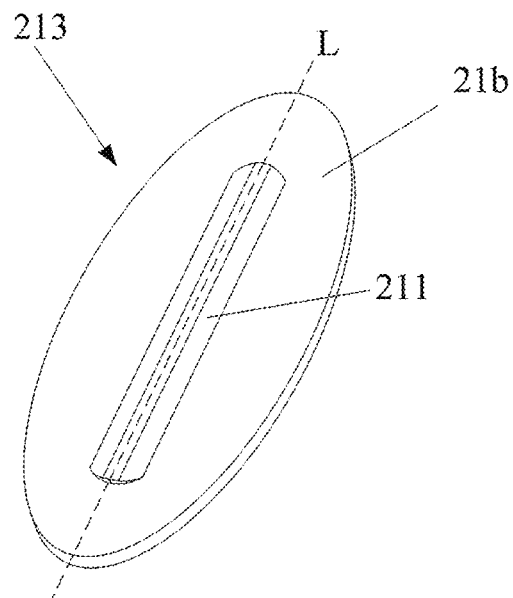
FIG. 14 is a perspective view of a cover of a bristle fixing member in a toothbrush head according to some embodiments of the present disclosure.
Figure 15:
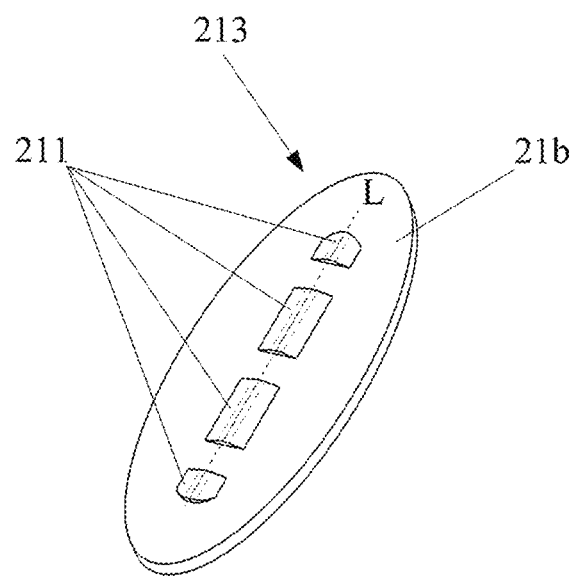
FIG. 15 is a perspective view of a cover of a bristle fixing member in a toothbrush head according to some embodiments of the present disclosure.

As illustrated in FIG. 14 and FIG. 15, the second side surface 21b of the bristle fixing member 21 is provided with a second protrusion 211. The second protrusion 211 defines a contact portion and a non-contact portion between the bristle fixing member 21 and the supporting beam 24. The second protrusion 211 may be a long strip structure as shown in FIG. 14, or a plurality of second protrusions 211 may be arranged in a straight line as shown in FIG. 15.

Figure 16:
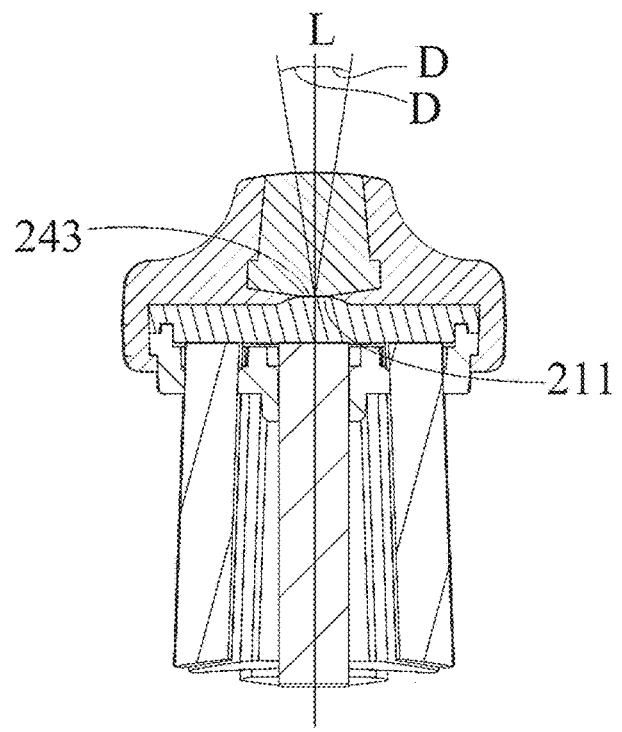
FIG. 16 is a cross-sectional view of a toothbrush head taken along a direction perpendicular to an extension direction of a toothbrush handle according to some embodiments of the present disclosure.

As illustrated in FIG. 14, FIG. 15 and FIG. 16, the second protrusion 211 is configured as a pivot-forming structure which defines an axis, and an extension direction of the second protrusion 211 is the same as the axis L of the pivot-forming structure. The supporting beam 24 and the bristle fixing member 21 mutually oscillate around the axis defined by the second protrusion 211 in a direction perpendicular to the extension direction of the body 23. An oscillate angle D between the supporting beam 24 and the bristle fixing member 21 is 0-5°.

Figure 17:
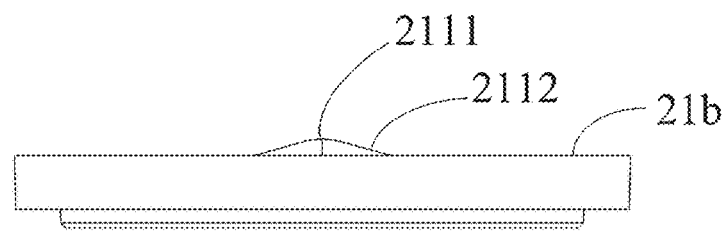
FIG. 17 is a side view of a cover of a bristle fixing member in a toothbrush head according to some embodiments of the present disclosure.

As illustrated in FIG. 17, the second side surface 21b of the bristle fixing member 21 includes a second support surface 2111 and a second oscillating surface 2112 located on both sides of the second support surface 2111. The second support surface 2111 serves as a contact portion and is in contact with the supporting beam 24, and the second oscillating surface 2112 forms a gap with the supporting beam 24 and serves as a non-contact portion.

As illustrated in FIG. 18A to FIG. 18F, a cross section of the second protrusion 211 along a direction perpendicular to the second side surface 21b of the bristle fixing member 21 is a triangle, a trapezoid or a crescent. Correspondingly, a portion of the first surface 24a of the supporting beam 24 that contacts the bristle fixing member 21 may be a plane or a concave surface.

Figure 18A:
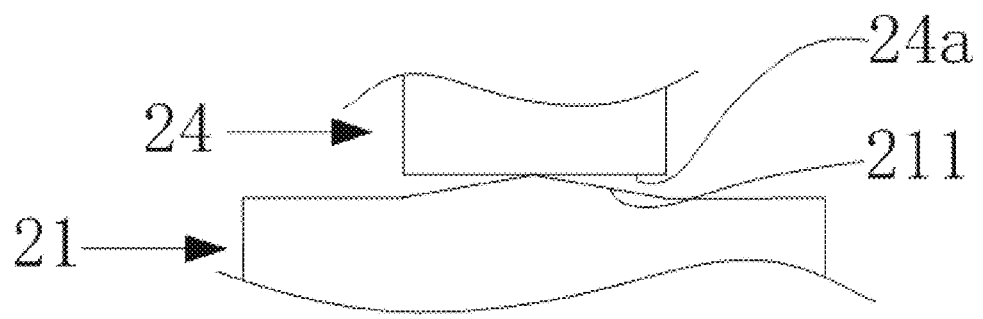
FIG. 18A-FIG. 18F are perspective views of a contact portion and a non-contact portion formed between a supporting beam and a bristle fixing member in a toothbrush head of a plurality of embodiments of the present disclosure.
Figure 18B:
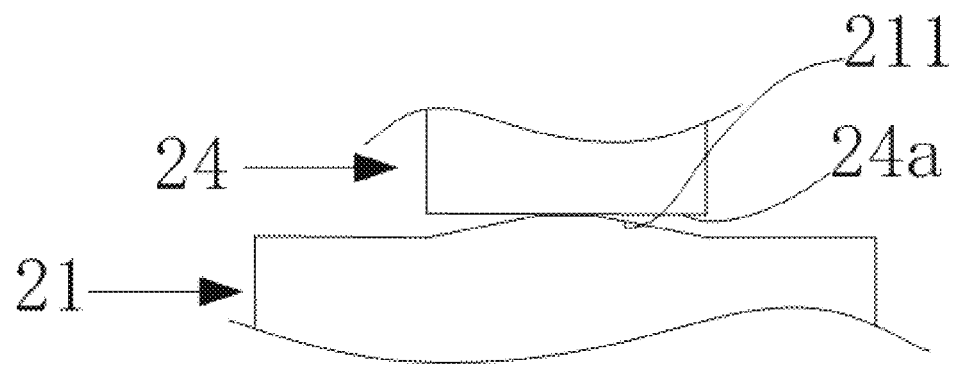
Figure 18C:
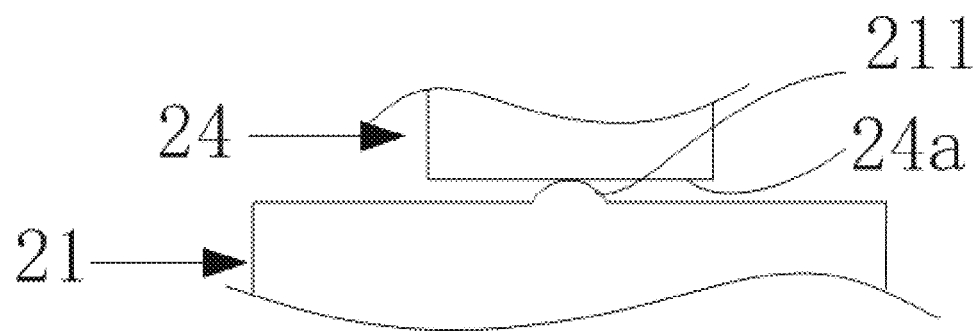
Figure 18D:
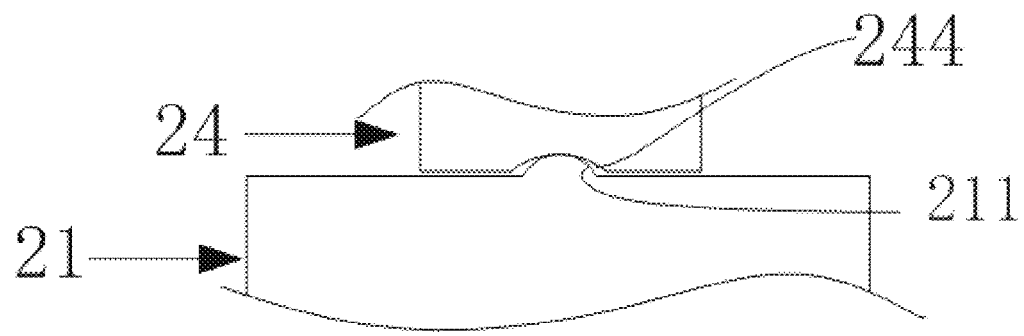
Figure 18E:
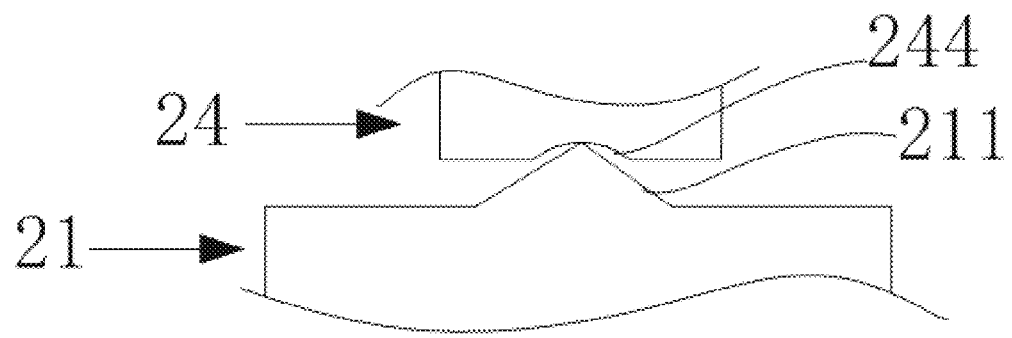
Figure 18F:
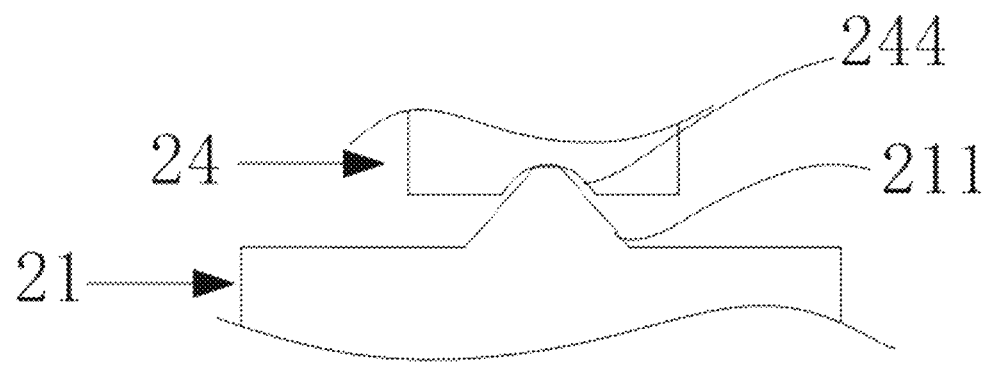

In some embodiments, as illustrated in FIG. 18D, the first surface 24a of the supporting beam 24 defines a second inner recess 244. A curvature radius of the second inner recess 244 is greater than a curvature radius of the second protrusion 211, allowing a contact portion and a non-contact portion are formed between the bristle fixing member 21 and the supporting beam 24.

Figure 19A:
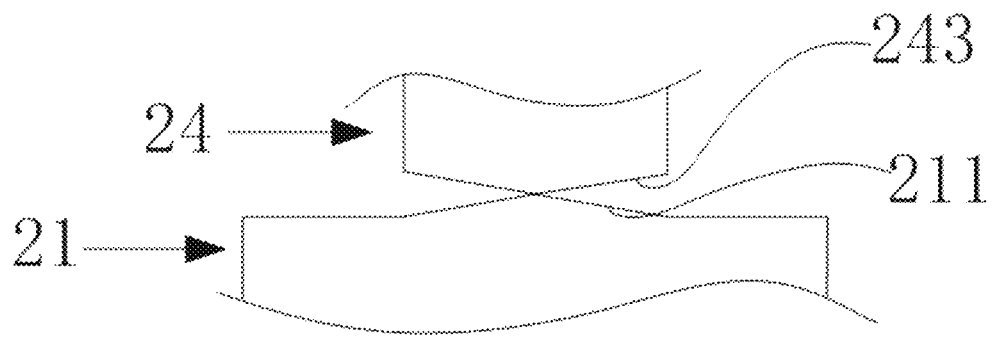
FIG. 19A-FIG. 19C are perspective views of a contact portion and a non-contact portion formed between a supporting beam and a bristle fixing member in a toothbrush head of a plurality of embodiments of the present disclosure.
Figure 19B:
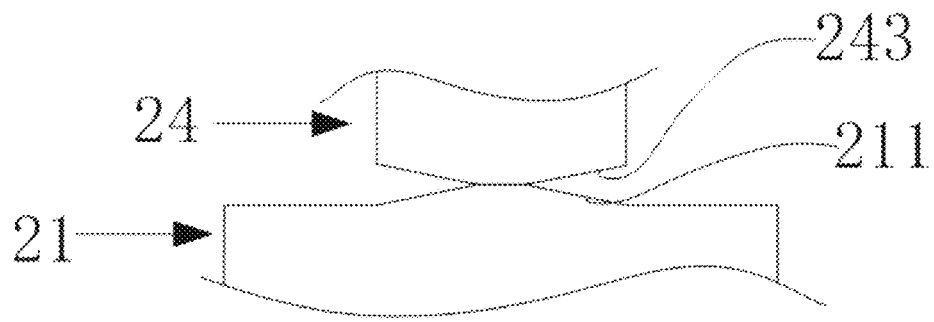
Figure 19C:
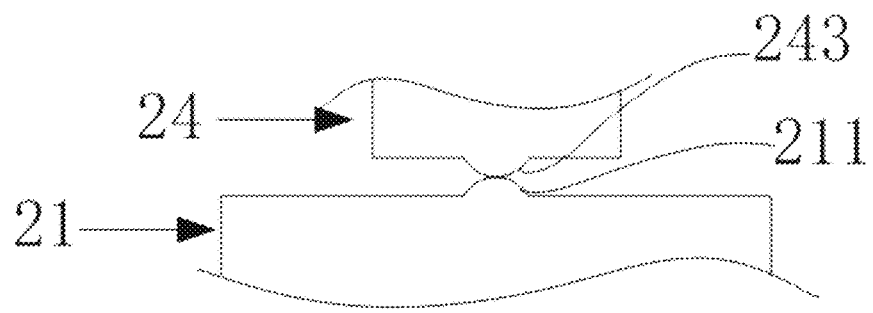

As illustrated in FIG. 19A to FIG. 19C, a first protrusion 243 is provided on the first surface 24a of the supporting beam 24, and a second protrusion 211 is provided on the second side surface 21b of the bristle fixing member 21. The first protrusion 243 and the second protrusion 211 are arranged abut against each other, allowing a contact portion and a non-contact portion to be formed between the bristle fixing member 21 and the supporting beam 24. A portion where the first protrusion 243 and the second protrusion 211 abut against each other defines an axis, around which the supporting beam 24 and the bristle fixing member 21 oscillate toward both sides of the first protrusion 243 and the second protrusion 211.

Shapes of the first protrusion 243 and the second protrusion 211 may be different. For example, a cross section of the first protrusion 243 along a direction perpendicular to the first surface 24a of the supporting beam 24 is a triangle, and a cross section of the second protrusion 211 along the direction perpendicular to the second side surface 21b of the bristle fixing member 21 may be a triangle, a trapezoid or a crescent.

The toothbrush head 100 described above may oscillate around the axis between the supporting beam 24 and the bristle fixing member 21. In this way, during use, the supporting beam 24 and the bristle fixing member 21 may oscillate according to the contour of the teeth of a user or the force exerted on the toothbrush head, thereby driving the bristles on the bristle fixing member 21 to oscillate accordingly. Therefore, the toothbrush head of the present disclosure may not only flexibly adjust the cleaning angle to match dental surfaces of a user, but also adapts to diverse tooth shapes, thereby enhancing brushing effectiveness.

The direction of the axis of the embodiments of the present disclosure may be varied in many ways, and the axis defined by the pivot-forming structure may be set in the extension direction shown in FIG. 4 and FIG. 14. In some embodiments, the pivot-forming structure on the supporting beam 24 (such as the first support surface 241 and the first protrusion 243) is formed along the extension direction of the first end 23a and the second end 23b of the body 23. Correspondingly, the pivot-forming structure on the bristle fixing member 21 (such as the second support surface 2111 and the second protrusion 211) is also formed along the extension direction of the first end 23a and the second end 23b of the body 23. Based on the toothbrush head with the axis structure in the embodiments, when cleaning the teeth in the up and down directions, a certain degree of oscillate occurs between the supporting beam 24 and the bristle fixing member 21, thereby driving the bristles to oscillate accordingly. This not only flexibly adjusts the cleaning angle to match the teeth, but also makes it easier for the oscillating bristles to enter the gaps between the teeth, thereby improving the brushing effectiveness.

Figure 20:
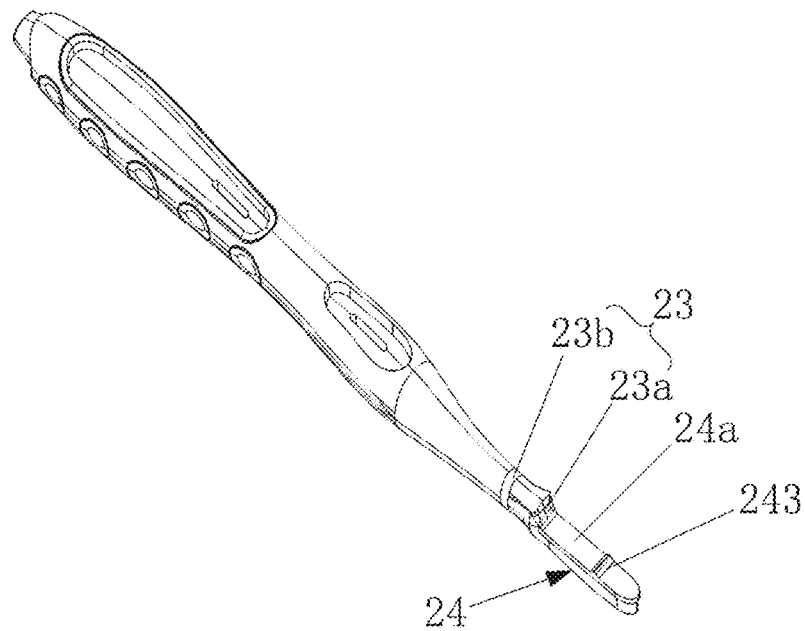
FIG. 20 is a perspective view of a supporting beam of a toothbrush head according to some embodiments of the present disclosure.
Figure 21:
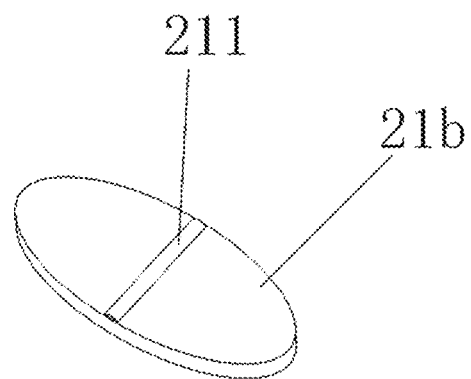
FIG. 21 is a perspective view of a cover of a bristle fixing member in a toothbrush head according to some embodiments of the present disclosure.
Figure 22:
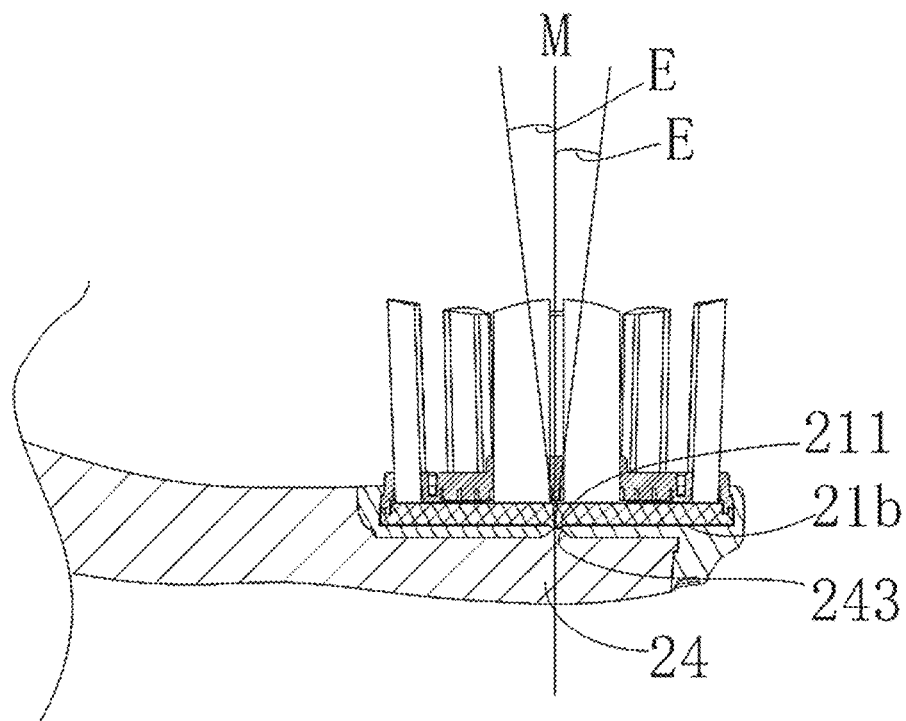
FIG. 22 is a cross-sectional view of a toothbrush head taken along an extension direction of a toothbrush handle according to some embodiments of the present disclosure.

The axis may also be set in the extension direction shown in FIG. 20-FIG. 22. In some embodiments, as illustrated in FIG. 20-FIG. 22, the pivot-forming structure (such as the first protrusion 243) on the supporting beam 24 is formed in a direction perpendicular to the extension direction of the supporting beam 24. Correspondingly, the pivot-forming structure (such as the second protrusion 211) on the second side surface 21b of the bristle fixing member is also formed in a direction perpendicular to the extension direction of the supporting beam 24. As illustrated in FIG. 22, a portion where the second protrusion 211 contacts the first protrusion 243 on the supporting beam 24 defines an axis, and the straight line M is the axal line of the axis. The supporting beam 24 and the bristle fixing member 21 oscillate relative to each other around the axis toward the first protrusion 243 and the second protrusion 211. An oscillate angle E between the supporting beam 24 and the bristle fixing member is 0~5°. Based on the toothbrush head with the shaft structure in the embodiments, when cleaning the teeth in the front-back direction, a certain degree of oscillate occurs between the supporting beam 24 and the bristle fixing member, thereby driving the bristles to oscillate accordingly. This not only flexibly adjust the cleaning angle to match with the teeth, but also makes it easier for the oscillating bristles to enter the gaps between the teeth, thereby improving brushing effectiveness.

Figure 23:
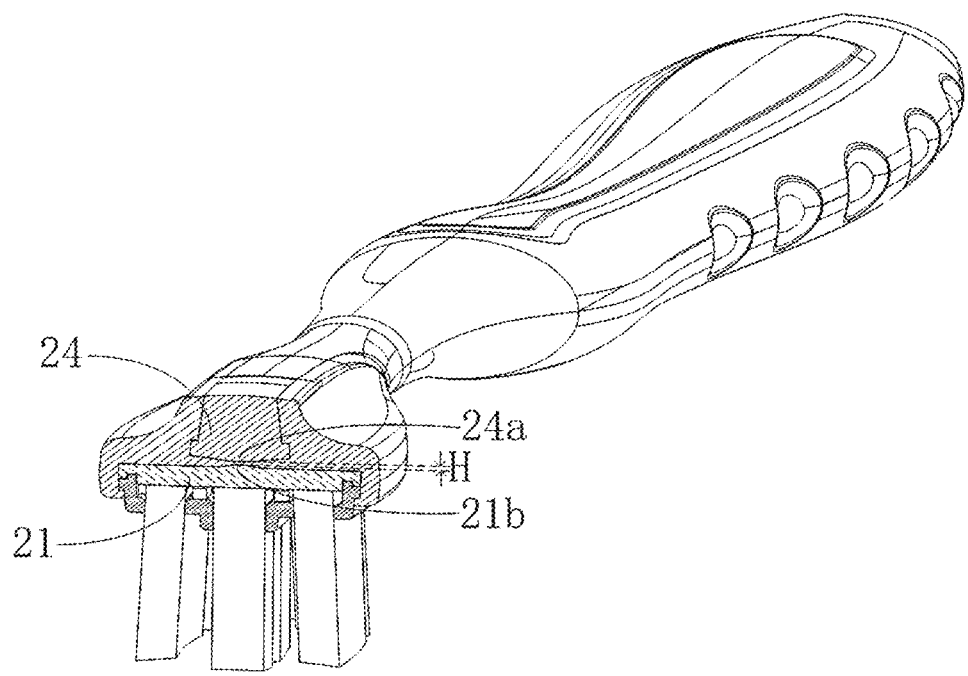
FIG. 23 is a cross-sectional view of a toothbrush head taken along a direction perpendicular to an extension direction of the toothbrush handle according to some embodiments of the present disclosure.

In some embodiments, as illustrated in FIG. 23, there is a gap H between the first surface 24a of the supporting beam 24 and the second side surface 21b of the bristle fixing member 21. The gap H is filled with the elastomer 25. In addition, a pivot-forming structure is provided on the supporting beam 24 and/or the bristle fixing member 21, allowing the supporting beam 24 and the bristle fixing member 21 to oscillate relative to each other around an axis defined by the pivot-forming structure.

In some embodiments, a vertical distance between the first support surface 241 of the supporting beam 24 and the second side surface 21b of the bristle fixing member 21 is smaller than a vertical distance between the first oscillating surface 242 and the second side surface 21b of the bristle fixing member 21. The first support surface 241 may be configured as the pivot-forming structure, and the portion where the first support surface 241 contacts the elastomer 25 defines the axis.

In some embodiments, there is a gap between the first protrusion 243 and the second side surface 21b of the bristle fixing member 21. The gap is filled with the elastomer 25. The first protrusion 243 provided on the supporting beam 24 may be configured as the pivot-forming structure, and a portion where the first protrusion 243 contacts the elastomer 25 defines the axis.

In some embodiments, there is a gap between the second protrusion 211 and the first surface 24a of the supporting beam 24. The gap is filled with the elastomer 25. The second protrusion 211 provided on the bristle fixing member 21 may be configured as a pivot-forming structure, and a portion where the second protrusion 211 contacts the elastomer 25 defines the axis.

In some embodiments, the first protrusion 243 and the second protrusion 211 are arranged opposite to each other. There is a gap between the two, and the gap is filled with elastomer to form the elastomer 25. The first protrusion 243 is provided on the supporting beam 24 and the second protrusion 211 is provided on the bristle fixing member 21. The portion where the first protrusion 243 contacts the elastomer 25 defines a first axis, and the portion where the second protrusion 211 contacts the elastomer 25 defines a second axis.

Since there is a gap between the first surface 24a of the supporting beam 24 and the second side surface 21b of the bristle fixing member 21, and the gap is filled with the elastomer 25. This deformable structure in the embodiments not only enables the supporting beam 24 and the bristle fixing member 21 to oscillate around the axis, but also utilizes the elastomer between the supporting beam 24 and the bristle fixing member 21 as a buffer. This buffering effect reduces the wear of the contact portion between the supporting beam 24 and the bristle fixing member 21 due to oscillating, thereby improving the service life of the toothbrush.

In some embodiments, as illustrated in FIG. 4 and FIG. 7, the first support surface 241 or the first protrusion 243 is defined with a fixing hole 245 extending toward the second side 24b. The fixing hole 245 is filled with elastomer. By setting the fixing hole 245 to be filled with the elastomer, the supporting beam 24 and the bristle fixing member 21 are more stably connected.

The core inventive concept of the present disclosure is arranging a supporting beam and a bristle fixing member on the brush head, and arranging a pivot-forming structure on the supporting beam and/or the bristle fixing member, enabling the supporting beam and the bristle fixing member to mutually oscillate, thereby driving the bristles to oscillate accordingly. This flexibly adjusts the cleaning angle when brushing teeth and improve the use effect of the toothbrush. Moreover, the elastomer is filled between the supporting beam and the bristle fixing member, which not only achieves a buffering effect, but also plays a role in controlling the oscillate between the supporting beam and the bristle fixing member and helps to restore to the original state after oscillating. Whether the elastomer only fills the non-contact portion of the supporting beam and the bristle fixing member, or fills the gap between the supporting beam and the bristle fixing member as a whole, it is within the protection scope of the present disclosure.

The above are only some embodiments of the present disclosure, and does not limit the patent scope of the present disclosure. All equivalent structural changes made by using the contents of the present disclosure specification and drawings under the inventive concept of the present disclosure, or directly/indirectly applied in other related technical fields are included in the protection scope of the present disclosure.

What is claimed is:

1. A toothbrush head, comprising a brush rod and a brush head assembly connected to the brush rod; the brush head assembly comprising:
   a bristle fixing member comprising a first side surface and a second side surface opposite to each other, the first side surface being provided with a plurality of bristles;
   a body comprising a first end and a second end opposite to each other, the second end being connected to the brush rod, a supporting beam extending from the first end, the supporting beam being located on a side of the bristle fixing member away from the plurality of bristles; an elastomer being provided between the supporting beam and the bristle fixing member, and a pivot-forming structure being provided on the supporting beam to allow the supporting beam and the bristle fixing member to oscillate relative to each other along an axis defined by the pivot-forming structure;

wherein the supporting beam comprises a first surface and a second surface opposite to each other, the first surface of the supporting beam faces the bristle fixing member, a first protrusion is provided on the first surface of the supporting beam;

the second side surface of the bristle fixing member is defined with a first inner recess, and a curvature radius of an inner arc surface of the first inner recess is greater than a curvature radius of an outer arc surface of the first protrusion, and the first inner recess and the first protrusion are configured to be the pivot-forming structure which defines the axis.

2. The toothbrush head according to claim 1, wherein the first surface of the supporting beam comprises a first supporting surface and a first oscillating surface, the first oscillating surface is located on both sides of the first supporting surface, a vertical distance between the first supporting surface and the second side surface of the bristle fixing member is smaller than a vertical distance between the first oscillating surface and the second side surface of the bristle fixing member.

3. The toothbrush head according to claim 1, wherein a cross section of the first protrusion along a direction perpendicular to the first surface of the supporting beam is a crescent; and/or a quantity of the first protrusion is at least two, and the at least two first protrusions are arranged in a straight line.

4. The toothbrush head according to claim 1, wherein the second side surface of the bristle fixing member comprises a supporting surface and a oscillating surface located on both sides of the supporting surface, a vertical distance between the supporting surface and the supporting beam is smaller than a vertical distance between the oscillating surface and the supporting beam.

5. The toothbrush head according to claim 1, wherein the bristle fixing member further comprises a peripheral side surface located between the first side surface of the bristle fixing member and the second side surface of the bristle fixing member, and one end of the elastomer extends from the second side surface of the bristle fixing member to the peripheral side surface of the bristle fixing member.

6. The toothbrush head according to claim 5, wherein the supporting beam further comprises a connecting surface connecting the first surface and the second surface; and another end of the elastomer extends to the connecting surface of the supporting beam.

7. The toothbrush head according to claim 6, wherein a portion of the elastomer covering the connecting surface of the supporting beam is defined with a concave arc groove, and/or the connecting surface is defined with a concave-convex surface.

8. The toothbrush head according to claim 1, wherein an oscillate angle between the supporting beam and the bristle fixing member ranges from 0 degree to 5 degrees.

9. The toothbrush head according to claim 1, wherein the second end of the body is detachably connected to the brush rod; or the second end of the body and the brush rod are an integral piece.

10. The toothbrush head according to claim 1, wherein one end of the brush rod away from the brush head assembly is defined with a motor shaft insertion hole.

11. The toothbrush head according to claim 1, wherein the supporting beam and the bristle fixing member define a contact portion and a non-contact portion, and the non-contact portion is filled with the elastomer.

12. A toothbrush head, comprising a brush rod and a brush head assembly connected to the brush rod; the brush head assembly comprising:
a bristle fixing member comprising a first side surface and a second side surface opposite to each other, the first side surface being provided with a plurality of bristles;
a body comprising a first end and a second end opposite to each other, the second end being connected to the brush rod, a supporting beam extending from the first end, the supporting beam being located on a side of the bristle fixing member away from the plurality of bristles; an elastomer being provided between the supporting beam and the bristle fixing member, and a pivot-forming structure being provided on the bristle fixing member to allow the supporting beam and the bristle fixing member to oscillate relative to each other along an axis defined by the pivot-forming structure;
wherein a protrusion is provided on the second side surface of the bristle fixing member;
wherein the supporting beam comprises a first surface and a second surface opposite to each other, the first surface of the supporting beam faces the bristle fixing member, the first surface of the supporting beam is defined with an inner recess, a curvature radius of the inner recess is greater than a curvature radius of the protrusion, and the inner recess and the protrusion are configured to be the pivot-forming structure which defines the axis.

13. The toothbrush head according to claim 12, wherein a quantity of the protrusion is at least two, and the at least two protrusions are arranged in a straight line.

14. A toothbrush head, comprising a brush rod and a brush head assembly connected to the brush rod; the brush head assembly comprising:
a bristle fixing member comprising a first side surface and a second side surface opposite to each other, the first side surface being provided with a plurality of bristles;
a body comprising a first end and a second end opposite to each other, the second end being connected to the brush rod, a supporting beam extending from the first end, the supporting beam being located on a side of the bristle fixing member away from the plurality of bristles; an elastomer being provided between the supporting beam and the bristle fixing member, and a pivot-forming structure being provided on the supporting beam and/or the bristle fixing member to allow the supporting beam and the bristle fixing member to oscillate relative to each other along an axis defined by the pivot-forming structure;
wherein the bristle fixing member comprises a brush sheet, one side of the brush sheet is defined with at least three bristle mounting areas;
wherein the at least three bristle mounting areas comprises: a first bristle mounting area away from the body, a third bristle mounting area proximal to the body, and a second bristle mounting area located between the first bristle mounting area and the third bristle mounting area; the plurality of bristles in the first bristle mounting area are tilted in a direction away from the body, and/or the plurality of bristles located on a peripheral side of the second bristle mounting area are tilted in a direction proximal to the body.

15. The toothbrush head according to claim 14, wherein each of the at least three bristle mounting area is defined with at least one bristle planting hole, the plurality of bristles are configured to be fused in the at least one the bristle planting hole; at least one groove is formed between the at least three bristle mounting areas, and the at least one groove is filled with the elastomer.

16. The toothbrush head according to claim 14, wherein an inclination angle of the plurality of bristles in the first bristle mounting area ranges from 1 degree to 5 degrees; and/or an inclination angle of the plurality of bristles located on the peripheral side of the second bristle mounting area ranges from 1 degree to 5 degrees; and/or an inclination angle of the plurality of bristles in the third bristle mounting area ranges from 1 degree to 5 degrees.

17. A toothbrush head, comprising a brush rod and a brush head assembly connected to the brush rod; the brush head assembly comprising:
 a bristle fixing member comprising a first side surface and a second side surface opposite to each other, the first side surface being provided with a plurality of bristles;
 a body comprising a first end and a second end opposite to each other, the second end being connected to the brush rod, a supporting beam extending from the first end, the supporting beam being located on a side of the bristle fixing member away from the plurality of bristles; an elastomer being provided between the supporting beam and the bristle fixing member, and a pivot-forming structure being provided on the supporting beam and/or the bristle fixing member to allow the supporting beam and the bristle fixing member to oscillate relative to each other along an axis defined by the pivot-forming structure;
 wherein the bristle fixing member comprises a brush sheet and a cover, one side of the brush sheet is defined with a plurality of bristle planting holes, and the plurality of bristles are configured to be welded in the plurality of bristle planting holes; the cover is located on and connected to one side of the brush sheet away from the plurality of bristles; one side of the cover away from the brush sheet is the second side of the bristle fixing member.

18. The toothbrush head according to claim 17, wherein an edge of the one side of the brush sheet away from the plurality of bristles comprises a first engaging portion, an outer periphery of the cover comprises a second engaging portion, and the first engaging portion and the second engaging portion are mutually engaged with each other.

19. A toothbrush head, comprising a brush rod and a brush head assembly connected to the brush rod; the brush head assembly comprising:
 a bristle fixing member comprising a first side surface and a second side surface opposite to each other, the first side surface being provided with a plurality of bristles;
 a body comprising a first end and a second end opposite to each other, the second end being connected to the brush rod, a supporting beam extending from the first end, the supporting beam being located on a side of the bristle fixing member away from the plurality of bristles; an elastomer being provided between the supporting beam and the bristle fixing member, and a pivot-forming structure being provided on the supporting beam and/or the bristle fixing member to allow the supporting beam and the bristle fixing member to oscillate relative to each other along an axis defined by the pivot-forming structure;
 wherein the supporting beam comprises a first surface and a second surface opposite to each other, the first surface of the supporting beam faces the bristle fixing member;
 wherein the first surface of the supporting beam is defined with a fixing hole extending toward the second surface, the fixing hole is defined by the first supporting surface, and the fixing hole is filled with the elastomer.

\* \* \* \* \*